United States Patent [19]
Pritchard et al.

[11] Patent Number: 5,470,014
[45] Date of Patent: Nov. 28, 1995

[54] BRAZING OF ALUMINUM-BERYLLIUM ALLOY

[75] Inventors: Ross E. Pritchard, Mississauga, Canada; Ronald J. Laub, Naperville, Ill.

[73] Assignee: Aluminum Design Corporation, Brookfield, Ill.

[21] Appl. No.: 300,276

[22] Filed: Sep. 2, 1994

[51] Int. Cl.$^6$ ...................................................... B23K 1/20
[52] U.S. Cl. ...................... 228/208; 228/212; 228/235.1; 228/262.51
[58] Field of Search ................................... 228/190, 208, 228/209, 210, 212, 235.1, 262.51

[56] References Cited

U.S. PATENT DOCUMENTS 5,263,640  11/1993  Mahoney et al. ...................... 228/190
5,289,765   3/1994  Yasui et al. .............................. 228/157

OTHER PUBLICATIONS

Muehlberger, D. E. and Reilly, J. J., "Improved Equipment Productivity Increases Applications for Ion Vapor Deposition of Aluminum" SAE Reprint 1985.
"Strength, Efficiency and Design Data for Beryllium Alloy Structures," Lockheed Missiles & Space Company, Oct. 17, 1967.
"Aluminum, Ion Vapor Deposition (IVD) of Process Specification," McDonnell Douglas, Jun. 1, 1992.
Nonferrous Alloys—Lockalloy, Mar. 1967, found in Aerospace Structural Metals Handbook, Department of Defense, 1989.

*Primary Examiner*—Samuel M. Heinrich
*Attorney, Agent, or Firm*—Jefferson Perkins

[57] ABSTRACT

Ion vapor deposition of aluminum is used to coat aluminum-beryllium alloy parts prior to fluxless vacuum brazing.

9 Claims, 3 Drawing Sheets

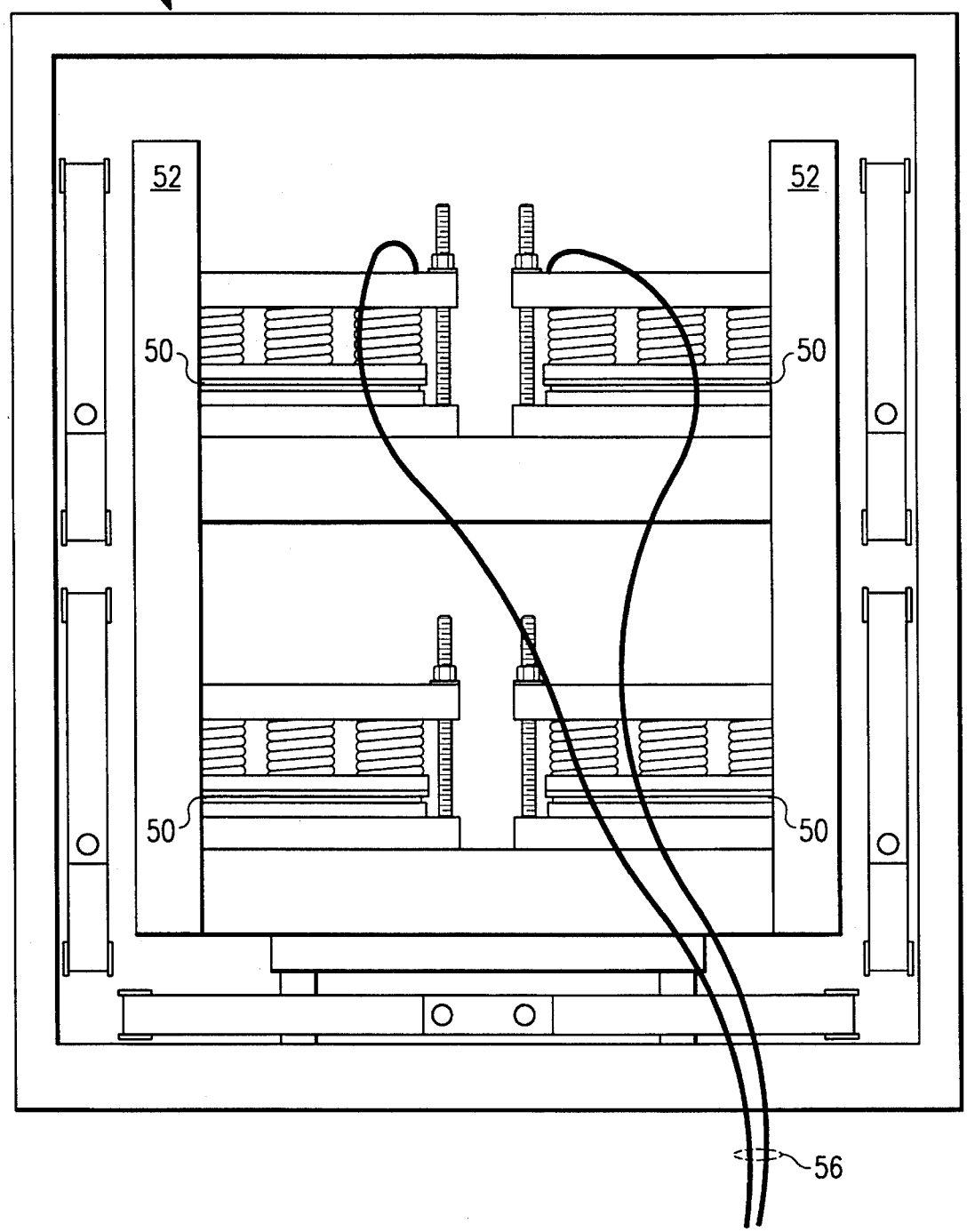

BRAZING OF ALUMINUM-BERYLLIUM ALLOY

TECHNICAL FIELD OF THE INVENTION

The present invention relates in general to brazing, and more particularly to a method and apparatus for brazing aluminum-beryllium alloys.

BACKGROUND OF THE INVENTION

Aluminum-beryllium alloys are finding application in components where low weight and strength are at a premium. For example, aluminum-beryllium alloys are finding use in the F22 fighter aircraft in the place of aluminum alloy components. The aluminum-beryllium alloys may, for example, consist of 20%, 40%, 60% beryllium by weight with the balance being aluminum. One popular alloy is AlBeMet AM162, which is 62% by weight beryllium and 38% by weight aluminum. These and similar aluminum-beryllium alloys have low weight, high stiffness, high thermal transfer, a low coefficient of thermal expansion, high heat capacitance, a high fatigue strength and good corrosion protection.

The industry presently uses the same processes for the brazing of aluminum-beryllium alloy parts as it uses for aluminum parts. However, problems have occurred with respect to the reliability and strength of junctions made with conventional aluminum brazing processes. Aluminum-beryllium alloys tend to form adherent, tenacious oxide surface films when heated to brazing temperatures—even at the very low pressures subsisting in vacuum brazing processes. These oxide films prevent the aluminum brazing alloys from wetting the aluminum-beryllium alloy surfaces resulting in inconsistent joints. Further, in jobs requiring the brazing of aluminum-beryllium alloy with aluminum, the brazing temperature must be held below the melting temperature of the aluminum or aluminum alloy being used. One method that has been tried to alleviate these problems is to populate the surfaces to be joined by brazing by subjecting the surfaces to an acid bath such as a nitric acid/sulfuric acid solution, but this has not worked. To date, the brazing of aluminum-beryllium alloys with this or unmodified aluminum brazing techniques has proven to be less than satisfactory. A need therefore exists for a brazing technique which will give strong bonds between brazed parts and a high degree of reliability.

SUMMARY OF THE INVENTION

The present invention is a process for brazing aluminum-beryllium alloy parts. Both of the parts to be brazed include aluminum in their composition, and at least one of the parts also has beryllium in its composition. Those parts including beryllium in their composition are treated with an ion vapor deposition of aluminum to enrich the surface with aluminum atoms. The parts are then brazed together using an aluminum brazing alloy, preferably using vacuum brazing as the brazing method.

According to another aspect of the invention, the parts are mated together so as to have a predetermined portion of aluminum brazing alloy between them. Equal compression is applied across a predetermined area of the first part in the direction of the second part. Preferably, a plurality of springs are used to supply substantial equal damping pressure across this predetermined area.

It has been discovered that by subjecting the parts to be brazed together with an ion vapor deposition of aluminum, otherwise known as "ivadizing", and by applying equal area compression forces to the two parts to be brazed, superior characteristics in tensile strength, shear strength and bursting strength can be obtained.

BRIEF DESCRIPTION OF THE DRAWINGS

Further aspects of the invention and their advantages can be discerned with reference to the following detailed description, in which like characters identify like parts and in which:

FIG. 5 is a perspective view of a plurality of brazing fixtures placed in a vacuum brazing oven prior to the brazing process.

DETAILED DESCRIPTION

Figure 1:
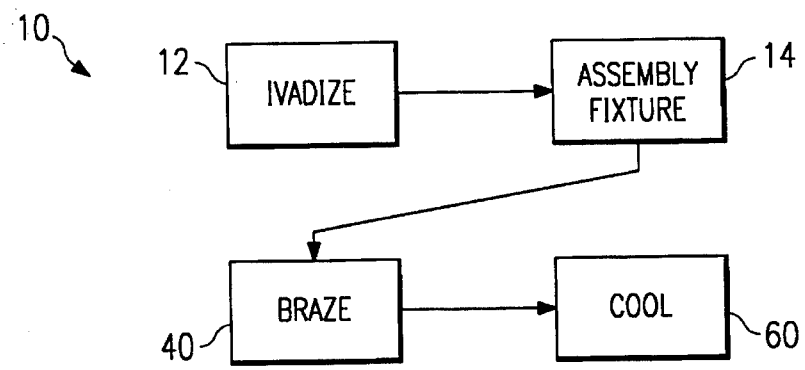
FIG. 1 is a schematic block diagram of a process according to the invention.

In FIG. 1, a process for brazing aluminum-beryllium alloy parts is indicated generally at 10. The first step of the process 10 is an ion vapor deposition 12, or "ivadizing", of all parts which had been fabricated using an aluminum-beryllium alloy. In the illustrated embodiment, two such part are provided, both of which are formed of a 68% beryllium-32% aluminum alloy sold, for example, under the trademarks "AlBeMet 162" and "Lockalloy". The process has equal application to situations in which less than all of the parts include beryllium in their makeup, and also has application to aluminum-beryllium alloys other than AlBeMet 162.

Ion vapor deposition ("Ivadizing") is well known in the art for coating materials, conventionally for galvanic compatibility and anticorrosion purposes. However, the inventors are not aware of the use of ivadizing as a portion of a brazing or other joining process. The ion vapor deposition of aluminum takes place by placing the components to be coated in a chamber. The chamber is pumped down to create a vacuum, an inert gas is introduced into the chamber, an aluminum vapor precursor chemical is introduced into the chamber, and a glow discharge is used to deposit partially ionized aluminum vapor on the surface of the part. Ivadizer chambers are available from Abar Ipsen; furthermore, several ivadizing industrial services exist. One of these services is AAA Plating and Inspection, Inc. of Compton, Calif.

Preferably, the parts are ivadized to a coating of at least 0.0003 inches thick. The coating process preferably is performed according to Process Specification No. 13143 of McDonell Douglas Corporation, with a Class 3 coating being achieved under that specification. The part should be glass bead peened prior to the ion vapor deposition process. Prior to glass bead peening, it is preferred that grit blasting be performed on the surfaces to be ivadized. The ivadizing process coats the surfaces to be brazed with a pure aluminum film which prevents the beryllium in the aluminum-beryllium alloy from oxidizing. This promotes good brazing alloy flow and superior, consistent joint strengths.

Figure 2:
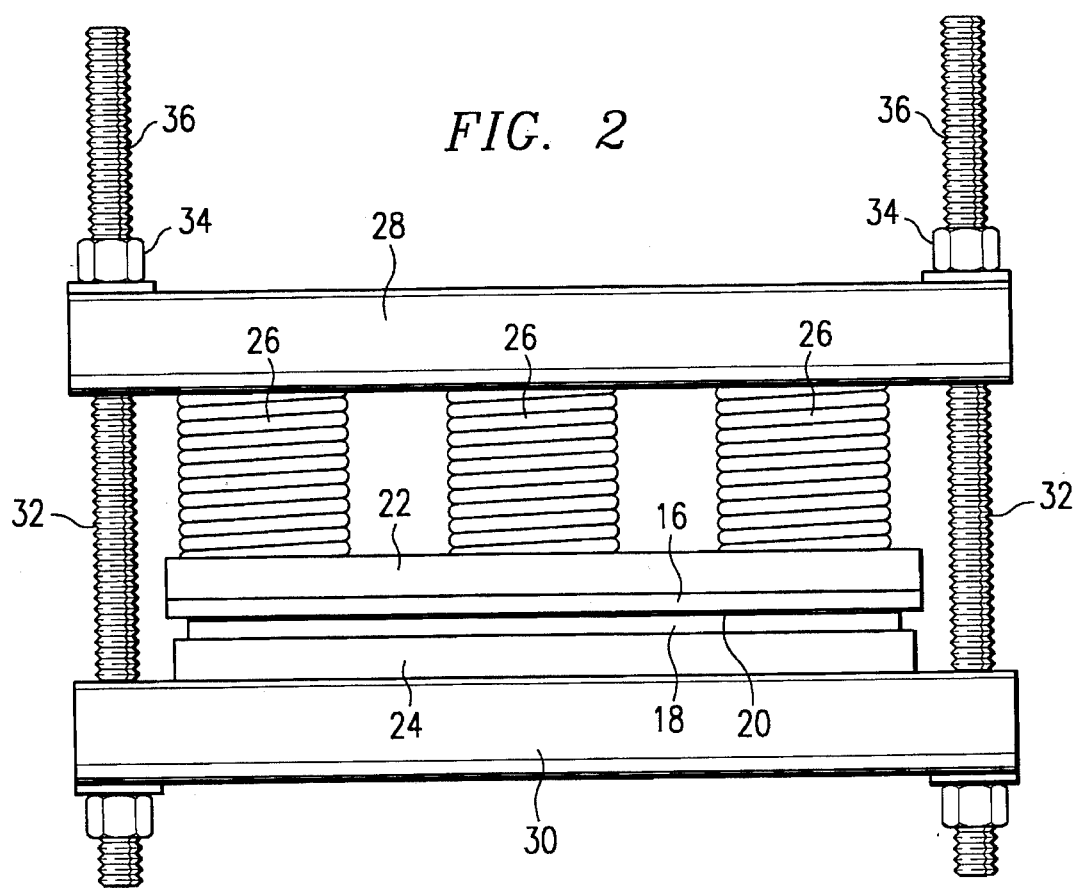
FIG. 2 is an elevational view of a pair of parts to be brazed as held in a brazing fixture.

After the parts are ivadized, the process proceeds to Step 14, during which the parts, an aluminum-brazing alloy and a brazing fixture are assembled together. An aluminum-brazing alloy is used which has a melting temperature that is substantially below the melting temperature of any aluminum alloy part being assembled. Aluminum alloys 718 and 4004 are among those that can be used as brazing alloys. The aluminum alloy is interposed between each pair of mating surfaces on the parts to be joined. For example, a sheet of aluminum brazing alloy can be used for interposition between two flat pieces, such as the two pieces 16 and 18 illustrated in elevational view in FIG. 2. The aluminum-brazing alloy sheet 20 is visible between the two flat pieces 16 and 18, which in the illustrated embodiment form two sides of a fluid heat exchanger for the mounting of electronic modules in avionic applications.

Although not shown, the pieces 16 and 18 define a circuitous set of internal passageways for the passage of a cooling fluid. These passage ways are filled with a corrugated aluminum alloy sheet called fin core or finstock; appropriate aluminum brazing alloy sheets are placed in conjunction with the finstock in order to bond them to the plates 16 and 18. Because of their low ductility, aluminum-beryllium alloys cannot presently be fabricated into thin sheets. Aluminum or aluminum fin core must therefore be used instead. This in turn necessitates the use of aluminum brazing alloys with melting temperatures that are below the melting temperatures of the fin core.

Figure 3:
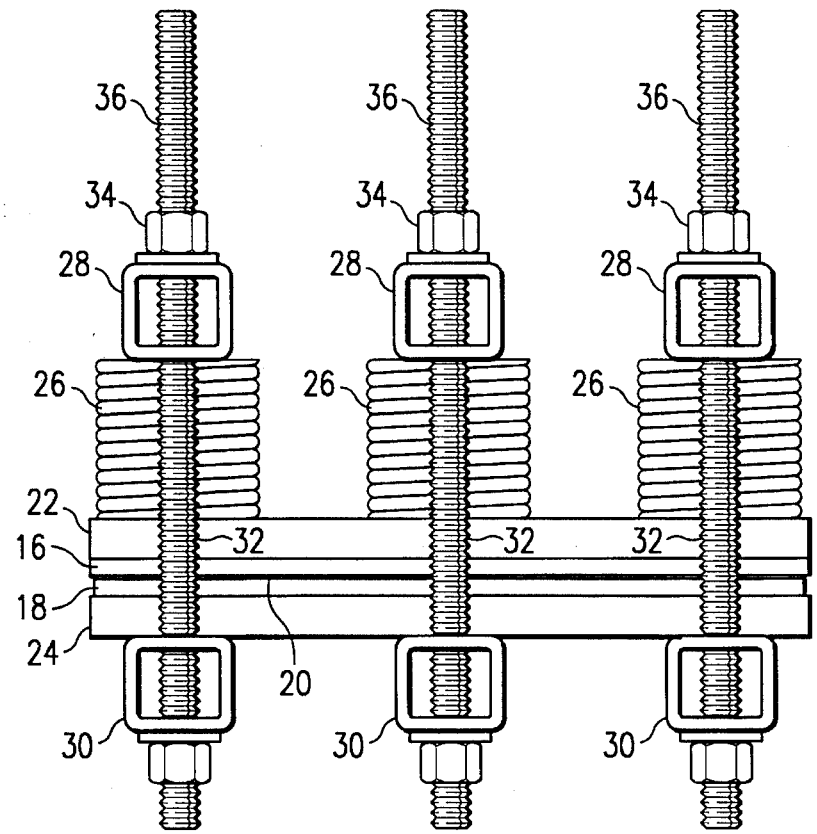
FIG. 3 is an elevational view of the brazing fixture of FIG. 2, shown at an angle of 90 degrees therefrom.
Figure 4:
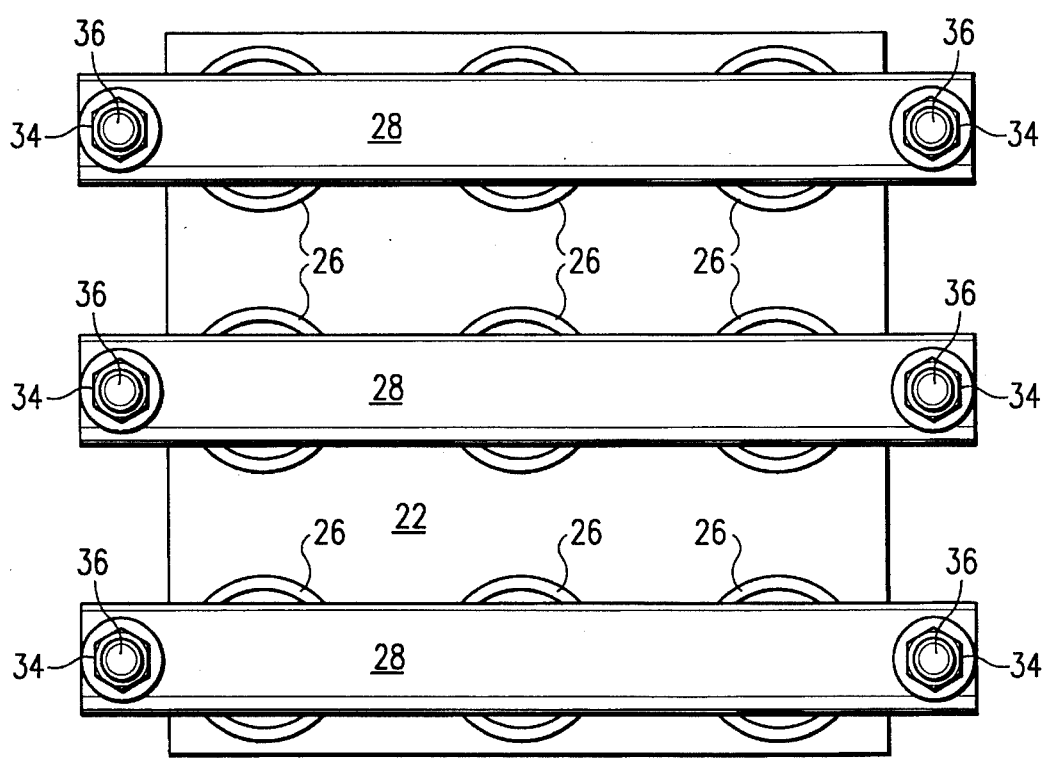
FIG. 4 is a top view of the brazing fixture illustrated in FIG. 2.

The mated parts 16 and 18 are then placed between an upper clamping plate 22 and a lower clamping plate 24. Plates 22 and 24 are clamped together with the aid of a plurality of compression springs 26 and a set of upper clamping bars 28 and corresponding lower clamping bars 30. In the illustrated embodiment, three sets of clamping bars 28, 30 are used, as is best illustrated in FIGS. 3 and 4. The compression springs are placed between the upper clamping bar 28 and the upper compression plate 22. Compression force is applied between clamping bars 28 and 30 by means of six clamping bolts or screws 32, each of which are provided with pairs of washers 34 and nuts 36.

In the illustrated embodiment, nine 32-pound springs are used to apply force equally throughout the surface area of the top part 16. It is recommended that equal compression force be applied to one of the parts to be joined in the direction of the other of the parts to be joined; the illustrated apparatus is only one way of doing this. Nine springs are torqued down all of the way in the illustrated embodiment; the area under compression is about 39 inches. It has been found that overtorquing the springs to give a compression of about 7.5 pounds per square inch yields good brazing results. Of course, the degree of compression will vary according to the nature of the parts being brazed.

It is preferred that compression springs 26 be used in order to continue to apply an even force to all portions of the compression plates 22 and 24, even as compression bars 28 and other components deform under heat. However, while spring loaded fixturing is preferred, it is not absolutely crucial to the success of the process for at least some parts.

Returning to FIG. 1, the next step in the process is a brazing step 40. It is preferred that the assembled fixture be vacuum-brazed with a maximum brazing temperature in the range of 1,120 degrees Fahrenheit to 1,160 degrees Fahrenheit if all components are aluminum-beryllium alloy, or in the range of 1,080 to 1,090 degrees Fahrenheit if one or more of the components is an aluminum alloy without the presence of beryllium. The high brazing temperature will also vary according to the thickness of the material and the part configuration. Vacuum brazing is the preferred method of brazing since no corrosive fluxes are required. Such fluxes result in entrapped flux residues in the braze joints.

FIG. 5 illustrates several assembled fixtures 50 having been placed in a rack 52 which in turn has been placed inside of a conventional vacuum furnace 54. A thermocouple 56 is used in order to monitor the temperature experienced by the assembled fixtures 50. The brazing process occurs by evacuating the vacuum furnace and introducing a low-pressure inert atmosphere. The temperature is raised sharply to the desired maximum brazing temperature, kept at the brazing temperature for a short time, and then cooled. Returning to FIG. 1, the cooling step is indicated at step 60. In this step, the fixtures 50 are cooled off quickly to a temperature below 980 degrees Fahrenheit. Then, the fixtures are allowed to cool slowly for 8 to 10 hours to bring them back down to ambient temperature. The brazing process is completed at this point.

EXAMPLE

Two groups of shear test specimens having six specimens apiece (designated S in the following table), two groups of tensile test specimens having three specimens apiece (designated T in the table) and two groups of burst test specimens having two specimens apiece (designated B in the table) were tested respectively for shear strength, tensile strength and burst pressure after having been assembled and brazed according to the process of the invention. Each tensile test specimen consisted of a rod three inches long and having a minimum diameter of 0.357 inches. The burst test specimen consisted of a first plate of AlBeMet alloy having on a first surface thereof a raised lip member defining a central cavity in the slab of 0.032 inches, with the slab being a total of 0.15 inches thick. The cavity formed in the rectangular slab was 5.538 inches long by 1.15 inches wide; the slab itself was 1.32 inches wide by 6.30 inches long. Into this cavity was inserted a conformal portion of aluminum finstock made out of aluminum alloy 3003. All AlBeMet parts were ivadized prior to brazing. A face sheet that was 6.03 inches long and 0.32 inches wide was assembled to the lip member of the lower slab using fluxless vacuum brazing. The assembled test specimen defined an elongated passageway for the passage of fluid. After brazing, the shear test specimens, tensile test specimens and burst test specimens were subjected to shear strength, tensile strength and burst pressure tests, respectively. The results of these tests are given in the following table:

TABLE

| Braze Run | Shear Test Specimen ID# | Shear Strength (PSI) | Tensile Test Specimen ID# | Tensile Strength (PSI) | Burst Test Specimen ID# | Burst Pressure (PSI) |
|---|---|---|---|---|---|---|
| 1 | S212 | 7,860 | T206 | 16,300 | B204 | 1,000 |
| 1 | S213 | 7,660 | T207 | 18,375 | B205 | 700 |
| 1 | S214 | 9,360 | T208 | 16,650 | | |
| 1 | S215 | 11,905 | | | | |
| 1 | S216 | 10,350 | | | | |
| 1 | S217 | 8,700 | | | | |
| Averages | | 9,340 | | 7,110 | | 850 |
| 2 | S218 | 5,520 | T209 | 13,190 | B206 | 625 |
| 2 | S219 | 5,160 | T210 | 16,540 | B207 | 825 |
| 2 | S220 | 6,240 | T211 | 16,390 | | |
| 2 | S221 | 6,960 | | | | |
| 2 | S222 | 5,700 | | | | |
| 2 | S223 | 6,530 | | | | |
| Averages | | 6,020 | | 15,375 | | 725 |
| 3 | S236 | 11,640 | T218 | 14,080 | B212 | 625 |

TABLE-continued

| Braze Run | Shear Test Specimen ID# | Shear Strength (PSI) | Tensile Test Specimen ID# | Tensile Strength (PSI) | Burst Test Specimen ID# | Burst Pressure (PSI) |
|---|---|---|---|---|---|---|
| 3 | S237 | 9,920 | T219 | 18,526 | B213 | 500 |
| 3 | S238 | 7,580 | T220 | 16,335 | | |
| 3 | S239 | 9,120 | | | | |
| 3 | S240 | 7,080 | | | | |
| 3 | S241 | 9,180 | | | | |
| Averages | | 9,085 | | 16,315 | | 562.5 |
| 4 | S242 | 4,800 | T221 | 16,950 | B214 | 650 |
| 4 | S243 | 6,540 | T222 | 14,670 | B215 | N/A |
| 4 | S244 | 4,650 | T223 | 13,335 | | |
| 4 | S245 | 5,640 | | | | |
| 4 | S246 | 6,360 | | | | |
| 4 | S247 | 5,340 | | | | |
| Averages | | 5,550 | | 14,985 | | 650 |

As the example test data show, the brazing process according to the invention is able to reliably produce brazed aluminum-beryllium alloy parts having high tensile and shear strength and a high burst pressure.

In summary, a novel process has been disclosed which makes it possible to make superior brazing joints between two components of aluminum-beryllium alloy, as well as between an aluminum alloy component on the one hand and an aluminum-beryllium alloy components on the other. While preferred embodiments of the invention have been described in conjunction with the above-detailed description, examples and drawings, the inventions not limited thereto but only by the scope and spirit of the appended claims.

We claim:

1. A process for brazing aluminum-beryllium alloy parts, comprising the steps of:

providing a plurality of metal parts including aluminum in their composition, said plurality including at least a first metal part which includes beryllium in its composition and a second metal part;

performing an ion vapor deposition of aluminum on at least the first metal part; and brazing the parts together using a brazing alloy.

2. The process of claim 1, wherein said second metal part is an aluminum-beryllium alloy in composition, said process further including the step of performing an ion vapor deposition of aluminum on the second metal part.

3. The process of claim 2, wherein all of said metal parts comprise aluminum-beryllium alloy, the process further including the step of brazing the parts together at a maximum temperature in the range of 1,120 to 1,160 Degrees Fahrenheit.

4. The process of claim 1, wherein at least one of said metal parts does not include beryllium, the process further including the step of brazing the parts together at a maximum temperature in the range of 1,080 to 1,090 Degrees Fahrenheit.

5. The process of claim 1, wherein said step of performing an ion vapor deposition on the first metal part is performed until a layer of aluminum which is at least 0.0003 inches thick has been deposited on the first metal part.

6. The process of claim 1, and further including the steps of:

after said step of performing the ion vapor deposition, mating the first part to the second part so as to have a predetermined portion of aluminum brazing alloy therebetween; and applying equal compression across an area of the first part in the direction of the second part.

7. The process of claim 3, and further comprising the step of clamping the first part to the second part using a plurality of springs to apply substantially equal clamping pressure across a predetermined area of the first part in the direction of the second part.

8. The process of claim 7, wherein said first and second parts are clamped together with a force at least 7.5 pounds per square inch.

9. The process of claim 7, and further comprising the step of equally positioning each of a two-dimensional matrix of springs across said area to achieve equal compression between the first part and the second part.

* * * * *